(12) United States Patent
Jang et al.

(10) Patent No.: US 10,341,909 B2
(45) Date of Patent: Jul. 2, 2019

(54) APPARATUS AND METHOD FOR DATA SCHEDULING OF BASE STATION USING LICENSED ASSISTED ACCESS IN WIRELESS COMMUNICATION SYSTEM

(71) Applicant: Samsung Electronics Co., Ltd., Suwon-si, Gyeonggi-do (KR)

(72) Inventors: Jaehyuk Jang, Suwon-si (KR); Kyeongin Jeong, Yongin-si (KR); Sangbum Kim, Suwon-si (KR); Soenghun Kim, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 15/067,885

(22) Filed: Mar. 11, 2016

(65) Prior Publication Data

US 2016/0269945 A1 Sep. 15, 2016

(30) Foreign Application Priority Data

Mar. 11, 2015 (KR) ........................ 10-2015-0033980

(51) Int. Cl.
*H04W 36/00* (2009.01)
*H04W 72/04* (2009.01)
(Continued)

(52) U.S. Cl.
CPC ....... *H04W 36/0055* (2013.01); *H04W 36/30* (2013.01); *H04W 72/0453* (2013.01); *H04W 72/1273* (2013.01)

(58) Field of Classification Search
None
See application file for complete search history.

(56) References Cited

U.S. PATENT DOCUMENTS

2009/0046660 A1 2/2009 Casati et al.
2013/0163463 A1 6/2013 Grayson et al.
(Continued)

FOREIGN PATENT DOCUMENTS

| CN | 104363598 | * | 2/2015 | ............ H04W 16/14 |
| CN | 104363598 A | | 2/2015 | |
| WO | 2013/167748 A1 | | 11/2013 | |

OTHER PUBLICATIONS

CMCC; Discussion on possible solutions for LAA; 3GPP TSG-RAN WG1 #79; R1-144940; Nov. 17-21, 2014; San Francisco, CA.
(Continued)

*Primary Examiner* — Ayaz R Sheikh
*Assistant Examiner* — Mariela Vidal Carpio
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. For licensed assisted access (LAA) technology used in a wireless communication system, an apparatus and a method for scheduling downlink data at a base station is provided. In the method, based on at least one part of parameters of a bearer to which the downlink data belongs, the base station determines a serving cell for scheduling the downlink data. Further, information about the identified serving cell is transmitted to a user equipment (UE).

12 Claims, 9 Drawing Sheets

(51) Int. Cl.
H04W 36/30 (2009.01)
H04W 72/12 (2009.01)

(56) References Cited

U.S. PATENT DOCUMENTS

| | | |
|---|---|---|
| 2014/0241317 A1 | 8/2014 | Jamadagni et al. |
| 2014/0307552 A1* | 10/2014 | Elsherif ................ H04W 36/14 370/235 |
| 2015/0056995 A1 | 2/2015 | Baillargeon |
| 2015/0139175 A1 | 5/2015 | Ratasuk et al. |
| 2015/0172931 A1* | 6/2015 | Jose ...................... H04W 16/14 370/329 |
| 2015/0181638 A1* | 6/2015 | Tabet .................. H04W 28/085 370/228 |
| 2015/0289208 A1* | 10/2015 | Liu ................... H04W 52/0229 370/252 |
| 2016/0226632 A1* | 8/2016 | Zhang .................... H04L 1/1887 |
| 2016/0255648 A1* | 9/2016 | Frenne .................. H04L 5/0048 |
| 2017/0041944 A1* | 2/2017 | Yang ................. H04W 72/1242 |
| 2017/0339568 A1* | 11/2017 | Wang ................... H04W 16/14 |

OTHER PUBLICATIONS

Intel Corporation; QoS support for LAA; 3GPP TSG RAN WG2 Meeting #89; R2-150168; , Feb. 9-13, 2015; Athens, Greece.

\* cited by examiner

APPARATUS AND METHOD FOR DATA SCHEDULING OF BASE STATION USING LICENSED ASSISTED ACCESS IN WIRELESS COMMUNICATION SYSTEM

CROSS-REFERENCE TO RELATED APPLICATION(S)

This application claims the benefit under 35 U.S.C. § 119(a) of a Korean patent application filed on Mar. 11, 2015 in the Korean Intellectual Property Office and assigned Serial No. 10-2015-0033980, the entire disclosure of which is hereby incorporated by reference.

TECHNICAL FIELD

The present disclosure relates to a wireless communication system. More particularly, the present disclosure relates to licensed assisted access technology that utilizes an unlicensed frequency band so as to assist a licensed band in the long term evolution (LTE) system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Based on the rapid growth of wireless communication technologies, communication system technologies have also greatly evolved. Currently, the long term evolution (LTE) system is popularized as the fourth generation mobile communication technology. In the LTE system, a variety of technologies are used to address increasing traffic demands. One such technology is carrier aggregation (CA), which uses one or more secondary carriers as well as a main carrier rather than a single carrier for communication between a user equipment (UE) and an evolved node B (eNB). The use of secondary carriers can remarkably increase transmission capacity. In the LTE system, a cell using the main carrier is referred to as a primary cell (PCell), and a cell using the secondary carrier is referred to as a secondary cell (SCell). The eNB covers one PCell and up to four SCells according to LTE Release 11. However, the number of available SCells is expected to be increased. Such a cell may be used with a serving cell.

The LTE system has allowed a communication operator to use a licensed band frequency allocated by a government or the like. Recently, in order to meet increasing traffic demands, a scheme for using unlicensed bands allocated for wireless local area network (LAN), Bluetooth, etc. has been discussed in the art. This is referred to as licensed assisted access (LAA) technology. An example of one such unlicensed bands is 5 GHz band used for Wi-Fi.

The LAA technology may consider a scenario in which a PCell uses a licensed band frequency and an SCell uses an unlicensed band frequency.

However, since an unlicensed band has already been used by other type systems such as wireless LAN, Bluetooth, etc., an increased interference issue may occur in comparison with a licensed band. Further, for coexistence with other systems, it is not easy to continuously use an unlicensed band.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for scheduling downlink data at a base station when licensed assisted access (LAA) technology is used in a wireless mobile communication system.

According to an aspect of the present disclosure, a base station performs scheduling based on the kind of bearer possessed by a user equipment (UE). More specifically, it is proposed to schedule an unacknowledged mode (UM) packet of a radio link control (RLC) layer to a licensed band cell. As for acknowledged mode (AM) bearers of RLC, it is proposed to schedule a signaling radio bearer to a licensed band cell and also to schedule a data radio bearer to a licensed band cell or an unlicensed band cell.

According to another aspect of the present disclosure, a base station performs scheduling depending on whether the data transmission to the RLC-AM bearer corresponds to the initial transmission or retransmission in the RLC layer. In case of retransmission, it is proposed to transmit a licensed band cell if the initial transmission or previous retransmission of packet was performed in an unlicensed band.

According to another aspect of the present disclosure, a base station identifies whether to transmit data to an unlicensed band cell or to a licensed band cell, depending on a quality of service (QoS) defined for each bearer. For example, it is proposed to identify the transmission to an unlicensed band cell or to a licensed band cell, depending on a QoS class identifier (QCI) of a bearer, an allocation and retention priority (ARP) of a bearer, whether a bearer supports a guaranteed bit rate (GBR), a packet delay budget, a packet error loss rate, and the like.

In accordance with an aspect of the present disclosure, a method for scheduling downlink data at a base station is provided. The method comprises identifying a serving cell for scheduling the downlink data, based on parameters of a bearer to which the downlink data belongs or based on whether a transmission of the downlink data satisfying at least one predetermined condition, and transmitting control information comprising information about the identified serving cell to a UE.

In accordance with another aspect of the present disclosure, a base station for scheduling downlink data to be transmitted to a UE is provided. The base station comprises a communication unit configured to transmit or receive data to or from the UE, and a control unit configured to determine a serving cell for scheduling the downlink data, based on parameters of a bearer to which the downlink data belongs or based on whether a transmission of the downlink data satisfying at least one predetermined condition, and to transmit control information comprising information about the identified serving cell to the UE.

When LAA technology is utilized in a wireless communication system, a base station schedules downlink data to a licensed band cell or an unlicensed band cell on the basis of data parameters and bearer parameters, thus enhancing the quality of a service and also providing a high-speed, high-capacity communication service.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It comprises various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" comprises reference to one or more of such surfaces.

A technology for providing a multi-link in a wireless communication system according to the present disclosure will be described.

Hereinafter, it is to be understood that the terms used for identifying an access node, the terms used for indicating a network entity, the terms used for indicating messages, the terms used for indicating an interface between network entities, the terms used for indicating various kinds of identification information, and the like are exemplary only and not to be construed as a limitation of this disclosure. Alternatively, another term for indicating an object or a target having the same technical meaning may be used. For example, although the following description uses evolved node B (eNodeB or eNB) as a base station, the present disclosure may be applied to any other type of a base station such as node B, a radio network subsystem (RNS), a base transceiver station (BTS), a wireless access point, etc.

Hereinafter, for convenience, the terms defined in the third generation partnership project long term evolution (3GPP LTE) are used. This disclosure may be, however, applied to any other system based on any other standard. Further, the term carrier aggregation (CA) disclosed herein may include CA between radio access technologies (RATs).

Figure 1:
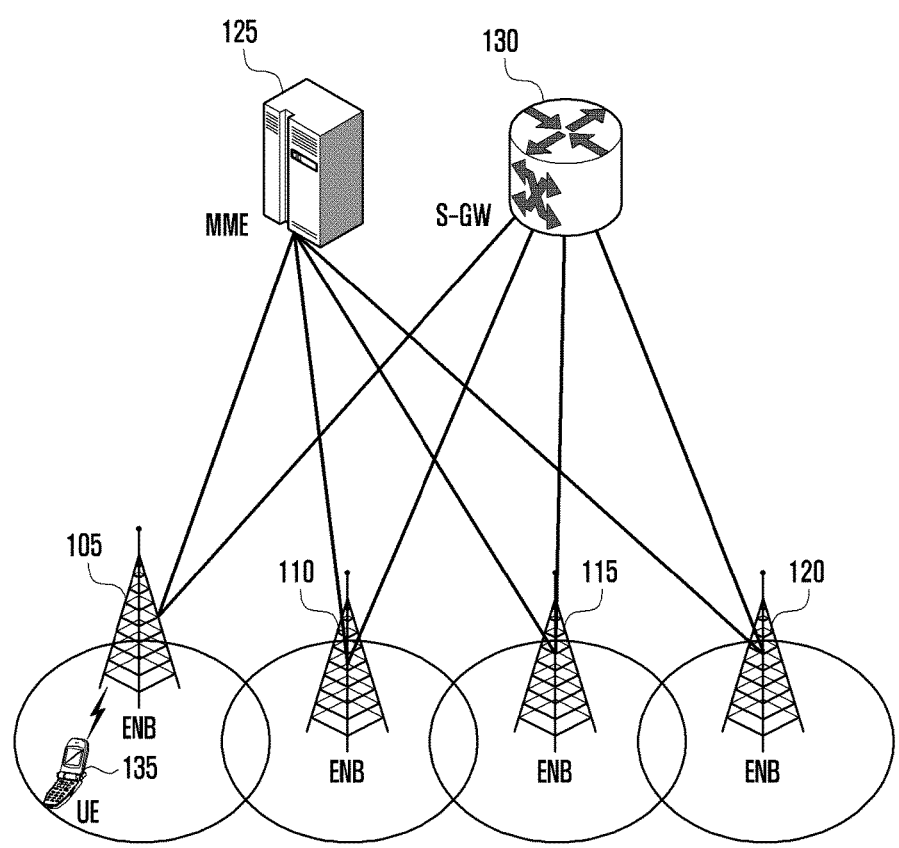
FIG. 1 is a diagram illustrating a structure of a long term evolution (LTE) system according to an embodiment of the present disclosure.

FIG. 1 is a diagram illustrating a structure of an LTE system according to an embodiment of the present disclosure.

Referring to FIG. 1, a radio access network of an LTE system is formed of eNBs (or referred to as base stations) 105, 110, 115 and 120, a mobility management entity (MME) 125, and a serving gateway (S-GW) 130. A user equipment (UE, or referred to as a user device, a terminal, a mobile station, etc.) 135 accesses an external network through the any of the eNBs 105~120 and the S-GW 130.

In FIG. 1, the eNBs 105~120 correspond to node Bs in a UMTS system. Each eNB is connected with the UE 135 through a radio channel and performs more complicated functions than a node B. In the LTE system, all user traffic comprising a real-time service such as voice over Internet protocol (VoIP) are offered through a shared channel. Therefore, an apparatus that performs scheduling by collecting status information such as a UE buffer status, an available transmission power status, and a channel status is required. The eNBs 105~120 perform this function. Typically, a single eNB controls a plurality of cells. In order to realize a transmission speed of, e.g., 100 Mbps, the LTE system uses orthogonal frequency division multiplexing (OFDM) as a radio access technique at a bandwidth of, e.g., 20 MHz. Additionally, an adaptive modulation and coding (AMC) scheme is applied for determining a modulation scheme and a channel coding rate, depending on a channel status of the UE 135. The S-GW 130 is an apparatus for providing a data bearer and also creates or removes the data bearer under the control of the MME 125. The MME 125 is an apparatus for performing a mobility management function for the UE 135 and any other control function, while being connected with a plurality of eNBs 105~120.

Figure 2:
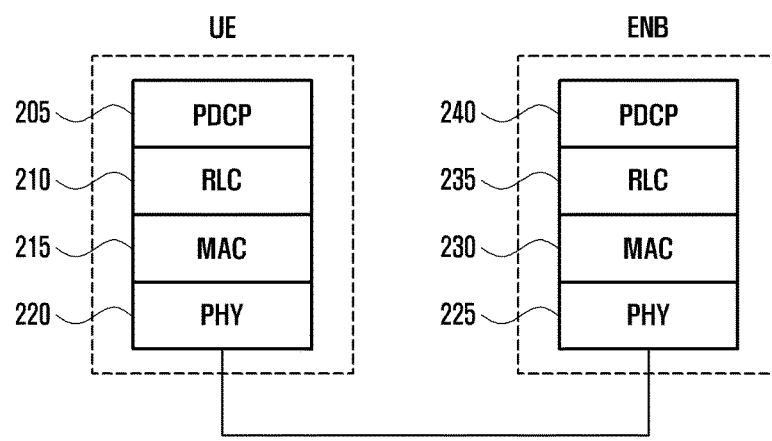
FIG. 2 is a diagram illustrating a radio protocol stack in an LTE system according to an embodiment of the present disclosure.

FIG. 2 is a diagram illustrating a radio protocol stack in an LTE system according to an embodiment of the present disclosure.

Referring to FIG. 2, a radio protocol stack of an LTE system comprises a packet data convergence protocol (PDCP) layer 205 or 240, a radio link control (RLC) layer 210 or 235, and a medium access control (MAC) layer 215 or 230. The PDCP layer 205 or 240 is responsible for IP header compression and decompression, etc., and the RLC layer 210 or 235 is responsible for segmentation of PDCP packet data units (PDUs) in a suitable size. The MAC layer 215 or 230 is connected with several RLC layer devices in one UE and performs a function to multiplex RLC PDUs to MAC PDU and demultiplex RLC PDUs from MAC PDU. A physical (PHY) layer 220 or 225 performs a function of channel-coding and modulating higher layer data and transmitting an OFDM symbol thereof to a radio channel, or a function of demodulating and channel-decoding an OFDM symbol received through a radio channel and delivering it to a higher layer. Also, the PHY layer uses hybrid automatic repeat request (HARQ) for additional error correction, and a receiving entity transmits one bit to a transmitting entity to notify whether a packet is received. This is referred to as HARQ acknowledge (ACK)/not-acknowledge (NACK) information. Downlink HARQ ACK/NACK information regarding uplink transmission is transmitted through a physical hybrid-ARQ indicator channel (PHICH), and uplink HARQ ACK/NACK information regarding downlink transmission is transmitted through a physical uplink control channel (PUCCH) or a physical uplink shared channel (PUSCH).

The physical layer of the LTE system has a structure of a radio frame with a length of 10 ms for downlink/uplink data transmission, and provides radio frame structures of two types as follows.

Type 1: applied to frequency division duplex (FDD)
Type 2: applied to time division duplex (TDD)

Regardless of such types, each radio frame has a length of 10 ms and is formed of ten sub-frames each having a length of 1 ms. Namely, a single radio frame is formed of ten sub-frames from sub-frame #0 to sub-frame #9.

In case of FDD, uplink and downlink are separated from each other so as to use different frequency bands. Each of uplink and downlink is formed of ten sub-frames.

In case of TDD, sub-frames in a single radio frame are divided into downlink sub-frames, uplink sub-frames, and special sub-frames according to setting. Special sub-frames are divided into a downlink pilot time slot (DwPTS), a guard period (GP), and an uplink pilot time slot (UpPTS), and also play a role of a switching point between downlink and uplink. Each length of DwPTS, GP and UpPTS may be settable while the sum of them, i.e., special sub-frame, has a length of 1 ms like the other sub-frame.

Figure 3:
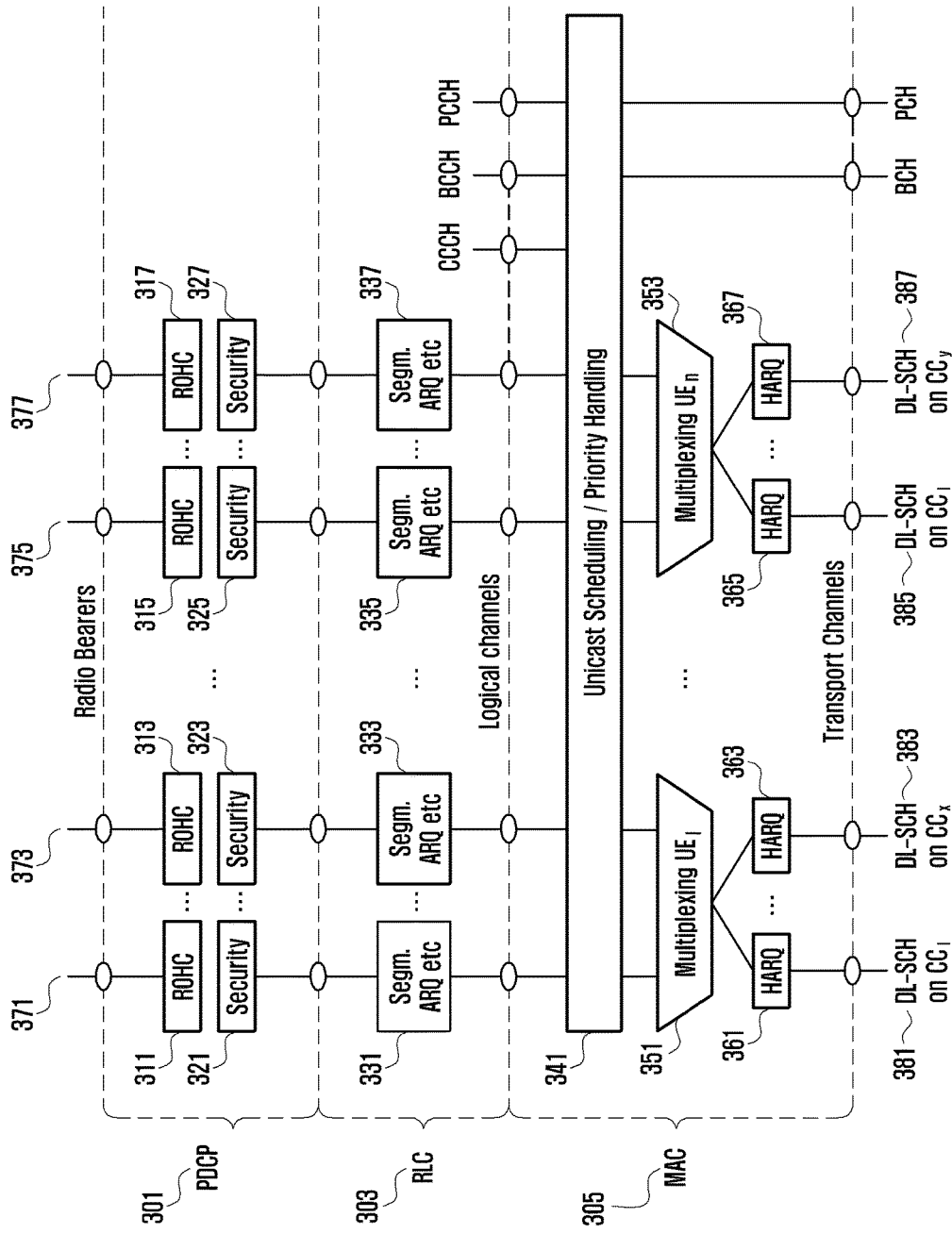
FIG. 3 is a diagram illustrating a second layer radio protocol stack of an evolved node B (eNB) in an LTE system according to an embodiment of the present disclosure.

FIG. 3 is a diagram illustrating a second layer radio protocol stack of an eNB in an LTE system according to an embodiment of the present disclosure.

Referring to FIG. 3, the second layer is formed of a PDCP layer 301, an RLC layer 303, and a MAC layer 305. The PDCP layer 301 performs IP header compression/decompression 311, 313, 315 and 317, packet encryption 321, 323, 325 and 327, and the like. The RLC layer 303 performs segmentation of PDCP PDUs in a suitable size and, based on bearer parameters, performs an ARQ 331, 333, 335 and 337 of packets to be transmitted to the bearer. The MAC layer 305 performs scheduling 341 to determine which packet of which user will be transmitted through which resource, depending on priority or the like, and performs multiplexing 351 and 353 of RLC PDUs to MAC PDU. Also, the MAC layer 305 determines a cell to which the MAC PDU will be transmitted, and performs transmission 381, 383, 385 and 387 based on HARQ 361, 363, 365 and 367 of each cell.

As shown in FIG. 3, each UE that accesses an eNB has one or more bearers 371, 373, 375 and 377. The bearer is a logical path through which data packets having similar quality of service (QoS) requirements are transmitted. In FIG. 3, UE1 has bearers 371 and 373, and UEn has bearers 375 and 377.

Additionally, for each bearer, PDCP and RLC have different parameters. For example, on the PDCP layer, the IP header compression/decompression 311, 313, 315 and 317 may be performed depending on bearers. Also, on the RLC layer, the segmentation of PDCP PDU may be performed depending on bearers, and the ARQ operation 331, 333, 335 and 337 may be performed. On the RLC layer, a bearer that transmits the PDCP PDU without size segmentation is referred to as an RLC-transparent mode (TM) bearer, a bearer that performs size segmentation, if necessary, but does not operate ARQ is referred to as an RLC-unacknowledge mode (UM) bearer, and a bearer that performs size segmentation and also performs the ARQ of RLC PDU to increase probability of transmission success in case of failure in RLC PDU transmission is referred to as an RLC-acknowledge mode (AM) bearer.

Further, such bearers may be classified into a signaling radio bearer (SRB) and a data radio bearer (DRB), depending on a type of packet. In the SRB, a control message used to control a UE by an eNB is transmitted. The control message may include a message created on a radio resource control (RRC) layer of an eNB and a UE, located above the PDCP layer, or a non-access stratum (NAS) message. The control message is used for the purpose of, for example, accepting access of the UE to the eNB, setting a parameter to be used at the eNB to the UE in the form of system information, etc., or instructing handover to another cell/eNB. Meanwhile, in the DRB, user data is transmitted. Depending on data parameters, this may be the aforesaid RLC-AM bearer or RLC-UM bearer. For example, when a packet for a voice service such as a VoIP service is transmitted, the RLC-UM bearer that does not operate with ARQ may be used since delay performance is important. In case of web browsing or file downloading, the RLC-AM bearer may be used since reliability is more important than delay.

Figure 4:
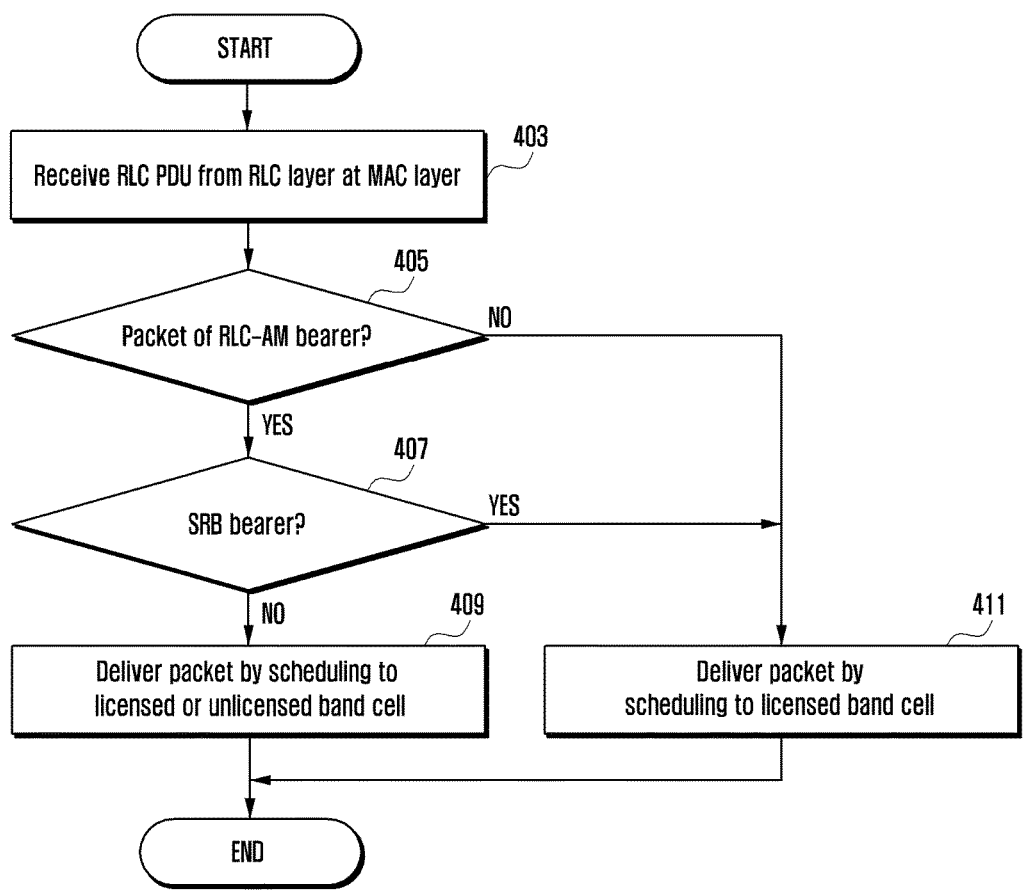
FIG. 4 is a flowchart illustrating operations of an eNB according to an embodiment of the present disclosure.

FIG. 4 is a flowchart illustrating operations of an eNB according to an embodiment of the present disclosure.

Referring to FIG. 4, when an eNB receives, from an S-GW, a data packet to be transmitted to a UE within the eNB coverage, the data packet is delivered to a MAC layer by passing through a PDCP layer and an RLC layer mapped to the eNB. In case an RLC of a bearer operates in an AM, an RLC packet is delivered for retransmission to the MAC layer when the ARQ operation ascertains a failure in transmission of packets previously delivered to the MAC layer. According to these operations, the MAC layer receives an RLC PDU from the RLC layer at operation 403.

The MAC layer determines whether the packet belongs to an RLC-AM bearer at operation 405. As discussed above, if packets belonging to an RLC-UM are lost, it is impossible to restore a packet lost during HARQ transmission since retransmission based on the ARQ operation is not applied. At operation 411, the MAC layer delivers a packet, which does not belong to the RLC-AM bearer (e.g., belongs to an RLC-UM bearer), to a physical layer by scheduling the packet to a cell using a licensed band among a plurality of cells currently allocated to the UE which is a destination of the packet. The licensed band cell may be primary cell (PCell) or a cell using a licensed band among secondary cells (SCells). The cell using a licensed band among SCells may include a primary SCell (PSCell) to which PUCCH transmission resources are allocated. This is applied similarly to other embodiments.

In case the packet belongs to the RLC-AM bearer, the eNB determines whether the RLC-AM bearer is an SRB or a DRB at operation 407. If the bearer is an SRB, the above-discussed operation 411 is performed. As mentioned above, the licensed band cell may be a PCell or a cell using a licensed band among SCells.

If the RLC-AM bearer is not an SRB, the eNB may schedule the packet to either an unlicensed band cell or a licensed band cell at operation 409. The licensed band cell may be a PCell or a cell using a licensed band among SCells, and the unlicensed band cell may be a cell using an unlicensed band among SCells.

In FIG. 4, operations 405 and 407 may change their order or may be performed simultaneously. In case of performing operation 407 first, if the packet does not belong to an SRB, operation 411 is performed without operation 405.

The SRBs may be classified into several SRBs according to logical channels, priorities, etc. For example, three SRBs, i.e., SRB0 using a common control channel (CCCH) logical channel, SRB1 using a dedicated control channel (DCCH) logical channel, and SRB2 using the DCCH logical channel, may be defined. According to an embodiment of this disclosure, if it is determined at operation 407 that the packet belongs to an SRB, the eNB may further determine whether the SRB is a predetermined SRB (e.g., SRB2 having lower priority than the other SRBs). In this case, operation 409 may be performed when the SRB is the predetermined SRB, and operation 411 may be performed when the SRB is not the predetermined SRB.

Figure 5:
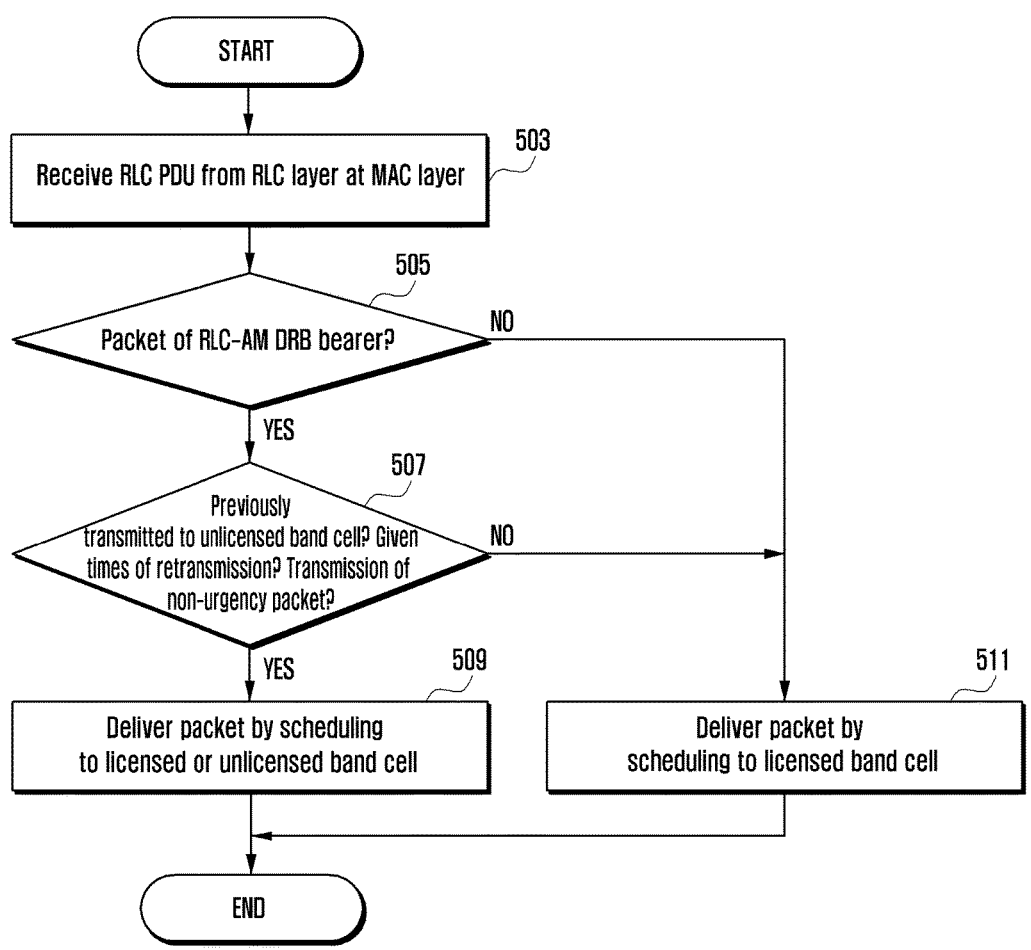
FIG. 5 is a flowchart illustrating operations of an eNB according to an embodiment of the present disclosure.

FIG. 5 is a flowchart illustrating operations of an eNB according to an embodiment of the present disclosure.

Referring to FIG. 5, when an eNB receives, from an S-GW, a data packet to be transmitted to a UE within the eNB coverage, the data packet is delivered to a MAC layer by passing through a PDCP layer and an RLC layer mapped to the eNB. In case an RLC of a bearer operates in an AM, an RLC packet is delivered for retransmission to the MAC layer when the ARQ operation ascertains a failure in transmission of a packet previously delivered to the MAC layer. According to these operations, the MAC layer receives an RLC PDU from the RLC layer at operation 503.

The MAC layer determines whether a bearer to which the packet belongs is an RLC-AM bearer and a DRB at operation 505. As discussed above, if packets belonging to RLC-UM are lost, it is impossible to restore a packet lost during HARQ transmission since retransmission based on the ARQ operation is not applied. Also, an SRB should be transmitted with higher reliability. Therefore, the packets belonging to the RLC-UM bearer or an SRB are transmitted to a licensed band cell. Namely, at operation 511, the MAC layer delivers packets, which do not belong to the RLC-AM DRB, to a physical layer by scheduling the packets to a cell using a licensed band among a plurality of cells currently allocated to a UE which is a destination of the packets. The licensed band cell may be a PCell or a cell using a licensed band among SCells.

If a bearer to which the packet belongs is the RLC-AM DRB, the eNB may perform a determination at operation 507 according to various embodiments given below.

Embodiment A: Determine whether transmission of the packet is an initial transmission or a retransmission.

Embodiment B: Determine whether the packet is a packet transmitted to an unlicensed band cell or a packet transmitted to a licensed band cell.

Embodiment C: In case of a retransmitted packet, determine the number of times of retransmission.

For the above determination, when delivering the RLC PDU to the MAC layer, the RLC layer may also deliver information about initial transmission or retransmission of the packet. In case of retransmission, information about the number of times of retransmission may be further included. For determination of initial transmission or retransmission at the RLC layer of UE, a technique to deliver an internal NACK message from the HARQ device (361, 363, 365 or 367 in FIG. 3) to the ARQ device (331, 333, 335 or 337 in FIG. 3) of the RLC layer may be used. Also, for the determination, the eNB may receive, from the RLC layer of the UE, information about a packet which has not been delivered yet among RLC PDUs.

Thereafter, in the above embodiments A, B and C, the eNB may operate as follows.

Embodiment A: In case the packet is retransmitted, the packet is scheduled to a licensed band cell among cells currently allocated to UE and delivered to the physical layer at operation 511. The licensed band cell may be a PCell or a cell using a licensed band among SCells. However, in case the packet is initially transmitted, the packet may be scheduled to either an unlicensed band cell or a licensed band cell at operation 509. The licensed band cell may be a PCell or a cell using a licensed band among SCells, and the unlicensed band cell may be a cell using an unlicensed band among SCells.

Embodiment B: In case the packet is a retransmission packet having been previously transmitted to an unlicensed band cell, the packet is scheduled to a licensed band cell among cells currently allocated to the UE and delivered to the physical layer at operation 511. The licensed band cell may be a PCell or a cell using a licensed band among SCells. However, in case the retransmission packet is a packet having been previously transmitted to a licensed band cell or a packet corresponding to initial transmission, the packet may be scheduled to either an unlicensed band cell or a licensed band cell at operation 509. The licensed band cell may be a PCell or a cell using a licensed band among SCells, and the unlicensed band cell may be a cell using an unlicensed band among SCells.

Embodiment C: In case the packet having been retransmitted more than a given number of times (e.g., three times) is retransmitted, the packet is scheduled to a licensed band cell among cells currently allocated to the UE and delivered to the physical layer at operation 511. The licensed band cell may be a PCell or a cell using a licensed band among SCells. However, in case the packet is a packet corresponding to retransmission not more than the given number of times or a packet corresponding to initial transmission, the packet may be scheduled to either an unlicensed band cell or a licensed band cell at operation 509. The licensed band cell may be a PCell or a cell using a licensed band among SCells, and the unlicensed band cell may be a cell using an unlicensed band among SCells.

The above determination in embodiments A and C may correspond to cell scheduling based on the number of previous transmission failures of a packet to be transmitted.

The above determination in embodiments A to C is made on the assumption that a bearer to which the packet belongs is the RLC-AM bearer and an SRB. On the contrary, the determination in embodiments A to C may be performed even though a bearer to which the packet belongs corresponds to only one of an RLC-AM bearer and an SRB. For example, when a bearer to which the packet belongs is the RLC-AM DRB, it is possible to determine whether to retransmit a packet having been retransmitted more than a given number of times (embodiment C).

In another embodiment, regardless of whether a bearer to which the packet belongs is the RLC-AM DRB, it is possible to determine whether to schedule the packet to a licensed band cell on the basis of packet parameters. For example, the eNB may determine whether the packet requires urgency. If it is determined that the packet requires urgency, the eNB may schedule the packet to a licensed band cell among cells currently allocated to the UE and deliver the packet to the physical layer. The licensed band cell may be a PCell or a cell using a licensed band among SCells. However, if the packet requires no urgency, the eNB may schedule the packet to either an unlicensed band cell or a licensed band cell. The licensed band cell may be a PCell or a cell using a licensed band among SCells, and the unlicensed band cell may be a cell using an unlicensed band among SCells.

The packet requiring urgency may include a mobility related message or a call setup related message. The mobility related message may correspond to a message instructing a peripheral cell measurement or a message instructing a handover to another eNB. In both cases, an RRCConnectionReconfiguration message is used to deliver mobility related instructions to the UE. In addition, the call setup related message may include RRCConnectionSetup message or RRCConnectionReestablishment message. These messages are RRC layer messages used by the eNB to instruct the UE to set up or reestablish a connection with the eNB. The operation of determining whether the packet requires urgency may include an operation of ascertaining whether the packet is the mobility related message or the call setup related message. The operation of determining whether the packet requires urgency may be performed only when a bearer to which the transmitted packet belongs is an SRB (or SRB1 of that) delivering a control message.

Figure 6:
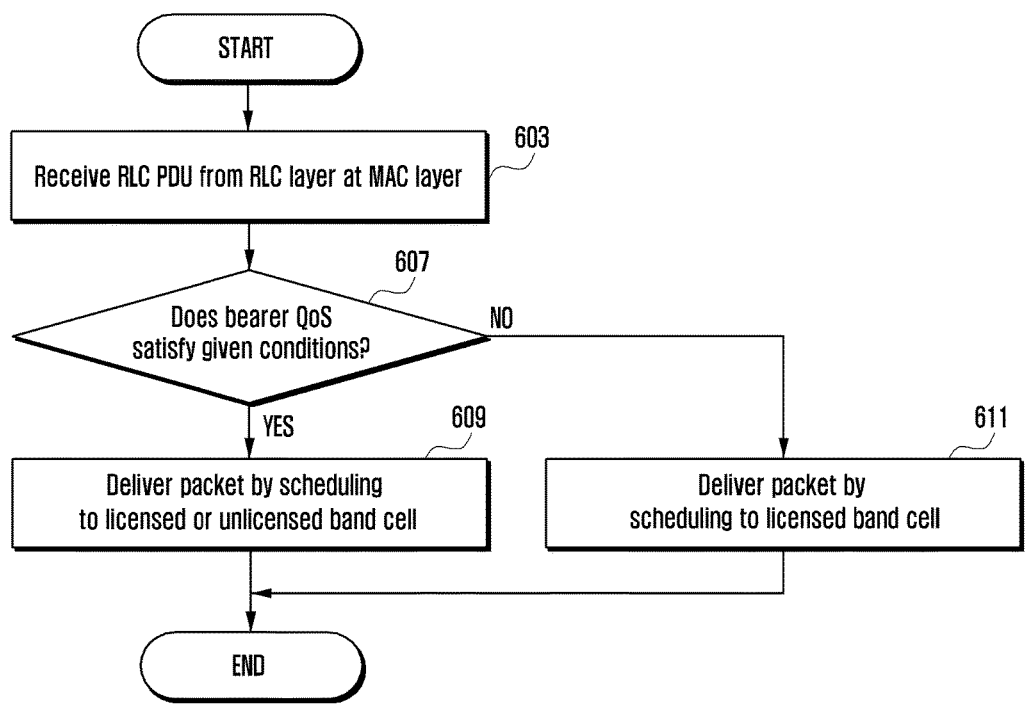
FIG. 6 is a flowchart illustrating operations of an eNB according to an embodiment of the present disclosure.

FIG. 6 is a flowchart illustrating operations of an eNB according to an embodiment of the present disclosure.

Referring to FIG. 6, when an eNB receives, from a S-GW, a data packet to be transmitted to a UE within the eNB coverage, the data packet is delivered to a MAC layer by passing through a PDCP layer and an RLC layer mapped to the eNB. In case an RLC of a bearer operates in an AM, an RLC packet is delivered for retransmission to the MAC layer when the ARQ operation ascertains a failure in transmission of a packet previously delivered to the MAC layer. According to these operations, the MAC layer receives an RLC PDU from the RLC layer at operation 603.

At operation 607, the MAC layer determines whether a QoS value of a bearer to which the packet belongs satisfies a given condition. At this operation, one or more of a QoS class identifier (QCI) of a bearer, whether a resource type is a guaranteed bit rate (GBR) supportable bearer, a priority level of a bearer, a packet delay budget of a packet, a packet error loss rate, and an allocation and retention priority (ARP) of a bearer may be determined. The ARP may have, for example, an integer value between 0 and 15.

Table 1 shows examples of a resource type, a priority level, a packet delay budget, and a packet error loss rate according to QCI.

TABLE 1

| QCI | Resource Type | Priority Level | Packet Delay Budget | Packet Error Loss Rate |
|---|---|---|---|---|
| 1 | GBR | 2 | 100 ms | $10^{-2}$ |
| 2 |  | 4 | 150 ms | $10^{-3}$ |
| 3 |  | 3 | 50 ms | $10^{-3}$ |
| 4 |  | 5 | 300 ms | $10^{-6}$ |
| 65 |  | 0.7 | 75 ms | $10^{-2}$ |
| 66 |  | 2 | 100 ms | $10^{-2}$ |
| 5 | Non-GBR | 1 | 100 ms | $10^{-6}$ |
| 6 |  | 6 | 300 ms | $10^{-6}$ |
| 7 |  | 7 | 100 ms | $10^{-3}$ |
| 8 |  | 8 | 300 ms | $10^{-6}$ |
| 9 |  | 9 | 300 ms | $10^{-6}$ |
| 69 |  | 0.5 | 60 ms | $10^{-6}$ |
| 70 |  | 5.5 | 200 ms | $10^{-6}$ |

The aforesaid given condition may be, for example, as follows.

Condition 1 (Example 1): In case the QCI of a bearer is not a specific value (e.g., 1, 2, 3, 4, 65 or 66 in Table 1)

Condition 2 (Example 1): In case the QCI of a bearer is a specific value

Condition 1 (Example 2): In case a bearer is non-GBR

Condition 2 (Example 2): In case a bearer is GBR

Condition 1 (Example 3): In case the delay budget of a bearer is equal to or greater than (or exceeds) a given critical value (e.g., 90 ms)

Condition 2 (Example 3): In case the delay budget of a bearer is smaller than (or does not exceed) the given critical value Condition 1 (Example 4): In case the packet error loss rate of a bearer is equal to or greater than (or exceeds) a given critical value (e.g., $10^{-3}$)

Condition 2 (Example 4): In case the packet error loss rate of a bearer is smaller than (or does not exceed) the given critical value Condition 1 (Example 5): In case the priority level of a bearer is equal to or greater than (or exceeds) a given critical value (e.g., 5)

Condition 2 (Example 5): In case the priority level of a bearer is smaller than (or does not exceed) the given critical value Condition 1 (Example 6): In case the ARP of a bearer is equal to or greater than (or exceeds) a given critical value (e.g., 7)

Condition 2 (Example 6): In case the ARP of a bearer is smaller than (or does not exceed) the given critical value The above given condition may correspond to condition 2 of the above-listed examples 1 to 6 and include a combination of condition 2 of two or more examples. In this case, the condition of example 1 may be not combined with any condition of examples 2 to 5. The reason is that a resource type, a priority level, a packet delay budget, and a packet error loss rate are determined when QCI is selected. For example, the given condition may be a combination of examples 2 and 3 in which a bearer is GBR and the delay budget of the bearer is smaller than (or does not exceed) a given critical value.

In case the QoS value of a bearer to which the packet belongs corresponds to condition 2 in the above example, the packet is scheduled to a licensed band cell among cells currently allocated to the UE and delivered to the physical layer at operation 611. The licensed band cell may be a PCell or a cell using a licensed band among SCells. However, in case the QoS value of the bearer corresponds to condition 1, the packet may be scheduled to either an unlicensed band cell or a licensed band cell at operation 609. The licensed band cell may be a PCell or a cell using a licensed band among SCells, and the unlicensed band cell may be a cell using an unlicensed band among SCells. Embodiments 1 to 3 show various examples of determining whether to be able to schedule a packet to an unlicensed band cell. Embodiments 1 to 3 may be applied in part, and all or part of such embodiments may be combined to create a new embodiment.

Figure 7:
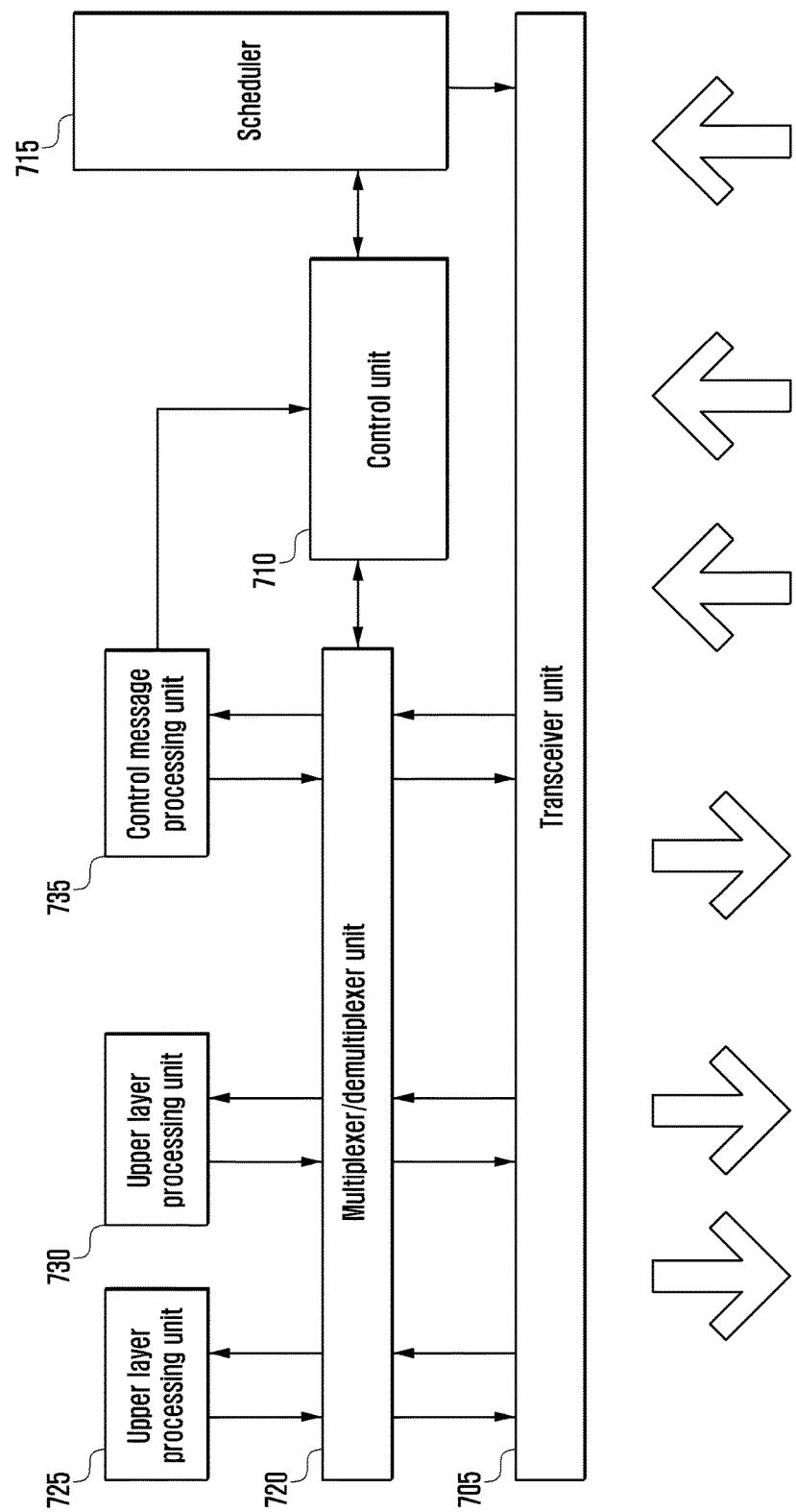
FIG. 7 is a block diagram illustrating an internal structure of an eNB according to an embodiment of the present disclosure.

FIG. 7 is a block diagram illustrating an internal structure of an eNB according to an embodiment of the present disclosure.

Referring to FIG. 7, the eNB may include a transceiver unit 705, a control unit 710, a multiplexer/demultiplexer unit 720, a control message processing unit 735, various upper layer processing units 725 and 730, and a scheduler 715. The transceiver unit 705 transmits data and control signals through a forward carrier and receives data and control signals through a backward carrier. In case two or more carriers are set up, the transceiver unit 705 performs transmission and reception of data and control signals through such carriers. The multiplexer/demultiplexer unit 720 multiplexes data generated at the upper layer processing units 725 and 730 or the control message processing unit 735, or demultiplexes data received at the transceiver unit 705 and delivers them to the upper layer processing units 725 and 730, the control message processing unit 735, or the control unit 710. The control message processing unit 735 processes a control message transmitted from a UE and takes a suitable action, or creates a control message to be transmitted to the UE and delivers it to the lower layer. The upper layer processing units 725 and 730, which may be configured for each service, process data generated in a user service such as FTP or VoIP and transfer them to the multiplexer/demultiplexer unit 720, or process data received from the multiplexer/demultiplexer unit 720 and transfer them to a service application on the upper layer. The scheduler 715 allocates transmission resources to a UE at a suitable time point by considering a buffer state of the UE, a channel status, an active time of the UE, and the like, and thereby allows the transceiver unit to process signals received from the UE or transmit signals to the UE.

In this disclosure, when the scheduler 715 performs scheduling with regard to a data packet received from the upper layer units 725 and 730, the packet may be scheduled to a licensed band cell or an unlicensed band cell, depending on the type of a bearer to which the packet belongs, depending on whether transmission of the packet is an initial transmission or retransmission, or depending on QoS information of a bearer to which the packet belongs.

Namely, as proposed in embodiment 1 discussed in FIG. 4, the scheduler 715 schedules the packet belonging to the ULC-UM or RLC-AM SRB bearer to a licensed band cell and also schedules the packet belonging to the RLC-AM DRB bearer to either a licensed band cell or an unlicensed band cell.

Alternatively, as proposed in embodiment 2 discussed in FIG. 5, the scheduler 715 schedules the data packet transmitted through RLC-AM DRB, depending on whether such transmission on the RLC layer is initial transmission or retransmission. Namely, in case of an initial transmission on the RLC layer, when a previous transmission is a transmission in a licensed band, or when the number of retransmission occurrences is smaller than (or does not exceed) a given critical value, the packet is scheduled to a licensed band cell or an unlicensed band cell. On the contrary, in case of a retransmission, when a previous transmission is a transmission in an unlicensed band, or when the number of retransmission occurrences is equal to or greater than (or exceeds) a given critical value, the packet is scheduled to a licensed band cell.

Alternatively, as proposed in embodiment 3 discussed in FIG. 6, the scheduler 715 determines whether to transmit a packet to a licensed band cell or an unlicensed band cell, depending on a QoS value of a bearer to which the packet belongs. For example, depending on the QCI of a bearer, the ARP of a bearer, whether a bearer is a GBR, a priority level, a packet delay budget, a packet error loss rate, etc., the scheduler 715 determines whether to transmit a packet to a licensed band cell or an unlicensed band cell.

Meanwhile, since an unlicensed frequency band is shared with devices using other technologies (e.g., WLAN, Bluetooth, etc.), a technique to occupy a channel is needed. Receiving a message from the control message processing unit 735 in order to occupy a channel and transmitting it to the transceiver unit 705 through the multiplexer unit 720 may cause a delay and thus have a difficulty in occupying a channel. Therefore, in this disclosure, a reserved signal for occupying a channel is created in advance and stored in the transceiver unit or a modem therein. If it is determined that an unlicensed band is empty, the stored signal is immediately transmitted to occupy a channel.

Figure 8:
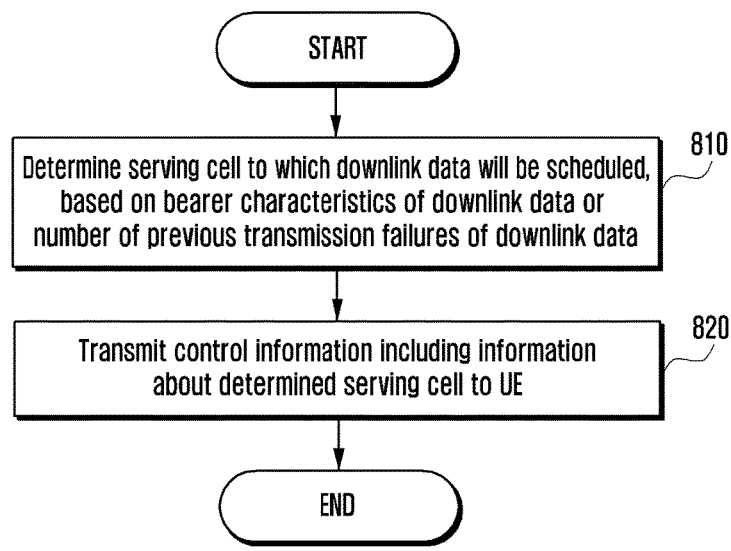
FIG. 8 is a flowchart illustrating operations of scheduling downlink data at an eNB according to an embodiment of the present disclosure.

FIG. 8 is a flowchart illustrating operations of scheduling downlink data at an eNB according to an embodiment of the present disclosure.

Referring to FIG. 8, at operation 810, the eNB determines a serving cell to which downlink data will be scheduled, based on bearer parameters of downlink data or the like. This data may be used with a packet. For example, the eNB may determine whether the bearer is an RLC-AM bearer, and if the bearer is not the RLC-AM bearer, may determine the first serving cell as a serving cell for scheduling the downlink data. The first serving cell may use a licensed band selected by the eNB.

If the bearer is the RLC-AM bearer, the first serving cell or the second serving cell may be determined as a serving cell for scheduling the downlink data. In another embodiment, if the bearer is the RLC-AM bearer, the eNB may determine whether the number of previous transmission failures of downlink data is equal to, greater than, or smaller than the first reference value. If the number of previous transmission failures of downlink data is equal to or greater than the first reference value, the first serving cell may be determined as a serving cell for scheduling the downlink data. If the number of previous transmission failures of downlink data is smaller than the first reference value, the first serving cell or the second serving cell may be determined as a serving cell for scheduling the downlink data. The second serving cell may use an unlicensed band selected by the eNB. In still another embodiment, if the bearer is the RLC-AM bearer, the eNB may determine whether previous transmission of downlink data is transmission through the first serving cell. If previous transmission of downlink data is not transmission through the first serving cell, the second serving cell may be determined as a serving cell for scheduling the downlink data.

In yet another embodiment, regardless of determining whether the bearer is the RLC-AM bearer, the eNB may determine whether the bearer is an SRB. If the bearer is not the SRB, the eNB may determine the first serving cell as a serving cell for scheduling the downlink data. If the bearer is the SRB, the eNB may determine the first serving cell or the second serving cell as a serving cell for scheduling the downlink data.

The eNB may determine whether the QCI of the bearer has a specific value. If the QCI of the bearer has the specific value, the eNB may determine the first serving cell as a serving cell for scheduling the downlink data. If the QCI of the bearer fails to have the specific value, the eNB may determine the first serving cell or the second serving cell as a serving cell for scheduling the downlink data.

The eNB may determine whether the bearer satisfies one of the first condition corresponding to the GBR, the second condition indicating that a packet delay budget of the bearer is smaller than the first reference value, the third condition indicating that a packet error loss rate of the bearer is smaller than the second reference value, and the fourth condition indicating that an allocation and retention priority of the bearer is smaller than the third reference value. If at least one of the first, second, third, and fourth conditions is satisfied, the eNB may determine the first serving cell as a serving cell for scheduling the downlink data.

If none of the first, second, third, and fourth conditions is satisfied, the eNB may determine the first serving cell or the second serving cell as a serving cell for scheduling the downlink data. Alternatively, the eNB may consider only part of the first to fourth conditions.

The eNB may determine whether the ARP of the bearer is smaller than the fourth reference value. If the ARP of the bearer is smaller than the fourth reference value, the eNB may determine the first serving cell as a serving cell for scheduling the downlink data. If the ARP of the bearer is not smaller than the fourth reference value, the eNB may determine the first serving cell or the second serving cell as a serving cell for scheduling the downlink data.

In case a serving cell is determined between the first serving cell of a licensed band and the second serving cell of an unlicensed band, the eNB may use information received from the UE. This information may include reference signal received power (RSRP), reference signal received quality (RSRQ), or received signal strength indicator (RSSI) with regard to the second serving cell. The eNB may select the second serving cell only when the strength, quality or interference level of a signal indicated by the above information satisfies a given condition. Separately from using the above information, the eNB may select the second serving cell when the success rate of the transmission attempts through the second serving cell is more than a preset success rate.

At operation 820, the eNB transmits control information comprising information about the determined serving cell to the UE. The control information may include, for example, downlink control information (DCI) of a PDCCH.

Figure 9:
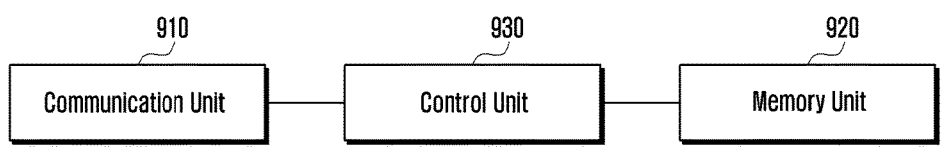
FIG. 9 is a block diagram illustrating an apparatus for scheduling downlink data at an eNB according to an embodiment of the present disclosure.

FIG. 9 is a block diagram illustrating an apparatus for scheduling downlink data at an eNB according to an embodiment of the present disclosure.

Referring to FIG. 9, the apparatus may include a communication unit 910, a memory unit 920, and a control unit 930. The apparatus may correspond to an eNB.

The communication unit 910 may perform communication with other network entities (e.g., an eNB, a UE, etc.) and thereby transmit or receive data or information associated with data scheduling.

The memory unit 920 may record information collected by the apparatus or information entered separately. The memory unit 920 may store programs and/or applications corresponding to functions executable in the apparatus, and also store data or the like created during the execution of such functions. The memory unit 920 may store, for example, control information comprising information about a serving cell to which downlink data will be scheduled.

The control unit 930 controls the overall status and operations of elements of the apparatus. The control unit 930 may control the memory unit 920 to store any information received through the communication unit 910. The control unit 930 may control any element configured to implement various embodiments discussed herein.

Although FIG. 9 illustrates the communication unit 910, the memory unit 920 and the control unit 930 as individual blocks for performing different functions, this is not to be considered as a limitation. Alternatively, the apparatus shown in FIG. 9 may further include any other block such as an input unit.

The methods disclosed herein may be implemented in hardware or software alone or in combination.

The software may be recorded on a computer-readable storage medium containing one or more programs (software modules). One or more programs stored in the computer-readable storage medium may be configured for execution by one or more processors of an electronic device such as a portable terminal. The programs include instructions causing the electronic device to execute the methods according to the various embodiments of the present disclosure.

Such programs (software module, software) may be stored in a random access memory, a non-volatile memory comprising a flash memory, a read only memory (ROM), an electrically erasable programmable ROM (EEPROM), a magnetic disc storage device, a compact disc ROM, digital versatile discs (DVDs) or other optical storage devices, and a magnetic cassette. Alternatively, the programs may be stored in a memory combining part or all of those recording media. A plurality of memories may be equipped.

The programs may be stored in an attachable storage device of the electronic device accessible via the communication network such as Internet, Intranet, local area network (LAN), wireless LAN (WLAN), or storage area network (SAN), or a communication network alone or in combination. The storage device may access the electronic device through an external port. A separate storage device in the communication network may access the portable electronic device.

While the present disclosure has been shown and described with reference to various embodiments thereof, it will be understood by those skilled in the art that various changes in form and details may be made therein without departing from the spirit and scope of this present disclosure as defined by the appended claims and their equivalents.

What is claimed is:

1. A method for transmitting downlink data by a base station to a terminal, the method comprising:
   determining, by at least one processor, whether a bearer associated with the downlink data is a radio link control-acknowledged mode (RLC-AM) bearer;
   when the bearer is the RLC-AM bearer:
      determining, by the at least one processor, whether the bearer is a signaling radio bearer (SRB);
      when the bearer is the SRB:
         determining, by the at least one processor, whether the bearer is included in a first SRB group or a second SRB group, wherein the first SRB group includes an SRB0 and an SRB1, and the second SRB group includes an SRB2;
         when the bearer is included in the second SRB group, selecting, by the at least one processor, a first serving cell using a licensed band or a second serving cell using an unlicensed band for transmitting the downlink data; and
         when the bearer is included in the first SRB group, selecting, by the at least one processor, the first serving cell using the licensed band for transmitting the downlink data;
      when the bearer is not the SRB:
         determining, by the at least one processor, whether transmission of the downlink data is an initial transmission;
         when the transmission of the downlink data is the initial transmission, selecting, by the at least one processor, the first serving cell using the licensed band or the second serving cell using the unlicensed band for transmitting the downlink data;
         when the transmission of the downlink data is a retransmission, determining, by the at least one processor, whether a number of transmission failures of the downlink data exceeds a first reference value;
         when the number of transmission failures of the downlink data does not exceed the first reference value, selecting, by the at least one processor, the first serving cell using the licensed band or the second serving cell using the unlicensed band for transmitting the downlink data; and
         when the number of transmission failures of the downlink data exceeds the first reference value, selecting, by the at least one processor, the first serving cell using the licensed band for transmitting the downlink data; and
   transmitting, by a transceiver, the downlink data on the selected serving cell to the terminal.

2. The method of claim 1, further comprising:
   when the bearer is not the RLC-AM bearer, selecting, by the at least one processor, the first serving cell using the licensed band for transmitting the downlink data.

3. The method of claim 1, further comprising:
   when the bearer is the RLC-AM bearer:
      determining, by the at least one processor, whether previous transmission of the downlink data is transmission on the first serving cell using the licensed band; and
      when the previous transmission of the downlink data is not transmission on the first serving cell, selecting, by the at least one processor, the second serving cell using the unlicensed band for transmitting the downlink data.

4. The method of claim 1, further comprising:
   determining, by the at least one processor, whether a quality of service (QoS) class identifier (QCI) of the bearer has a specific value;
   when the QCI of the bearer has the specific value, selecting, by the at least one processor, the first serving cell using the licensed band for transmitting the downlink data; and
   when the QCI of the bearer fails to have the specific value, selecting, by the at least one processor, the first serving cell using the licensed band or the second serving cell using the unlicensed band for transmitting the downlink data.

5. The method of claim 1, wherein the determining of the serving cell comprises:
   determining, by the at least one processor, whether the bearer satisfies one of a first condition corresponding to a guaranteed bit rate, a second condition indicating that a packet delay budget of the bearer is smaller than a predetermined first reference value, a third condition indicating that a packet error loss rate of the bearer is smaller than a predetermined second reference value, and a fourth condition indicating that an allocation and retention priority of the bearer is smaller than a predetermined third reference value;
   when at least one of the first, second, third and fourth conditions is satisfied, selecting, by the at least one processor, the first serving cell using the licensed band for transmitting the downlink data; and
   when none of the first, second, third and fourth conditions is satisfied, selecting, by the at least one processor, the first serving cell using the licensed band or the second serving cell using the unlicensed band for transmitting the downlink data.

6. The method of claim 1, further comprising:
   determining, by the at least one processor, whether an allocation and retention priority (ARP) of the bearer is smaller than a predetermined fourth reference value;
   when the ARP of the bearer is smaller than the fourth reference value, selecting, by the at least one processor, the first serving cell as the serving cell for scheduling the downlink data; and
   when the ARP of the bearer is not smaller than the fourth reference value, selecting, by the at least one processor, the first serving cell using the licensed band or the second serving cell using the unlicensed band for transmitting the downlink data.

7. A base station for transmitting downlink data to a terminal, the base station comprising:
- a transceiver configured to transmit or receive data to or from the UE; and
- at least one processor coupled with the transceiver and configured to:
  - determine whether a bearer associated with the downlink data is a radio link control-acknowledged mode (RLC-AM) bearer;
  - when the bearer is the RLC-AM bearer:
    - determine whether the bearer is a signaling radio bearer (SRB);
    - when the bearer is the SRB:
      - determine whether the bearer is included in a first SRB group or a second SRB group, wherein the first SRB group includes an SRB0 and an SRB1, and the second SRB group includes an SRB2;
      - when the bearer is included in the second SRB group, select a first serving cell using a licensed band or a second serving cell using an unlicensed band for transmitting the downlink data; and
      - when the bearer is included in the first SRB group, select the first serving cell using the licensed band for transmitting the downlink data;
    - when the bearer is not the SRB:
      - determine whether transmission of the downlink data is an initial transmission;
      - when the transmission of the downlink data is the initial transmission, select the first serving cell using the licensed band or the second serving cell using the unlicensed band for transmitting the downlink data;
      - when the transmission of the downlink data is a retransmission, determine whether a number of transmission failures of the downlink data exceeds a first reference value;
      - when the number of transmission failures of the downlink data does not exceed the first reference value, select the first serving cell using the licensed band or the second serving cell using the unlicensed band for transmitting the downlink data; and
      - when the number of transmission failures of the downlink data exceeds the first reference value, select the first serving cell using the licensed band for transmitting the downlink data, and
  - control the transceiver to transmit, to the terminal, the downlink data on the selected serving cell.

8. The base station of claim 7, wherein the at least one processor is further configured to:
- when the bearer is not the RLC-AM bearer, select the first serving cell using the licensed band for transmitting the downlink data.

9. The base station of claim 7, wherein the at least one processor is further configured to:
- when the bearer is the RLC-AM bearer:
  - determine whether previous transmission of the downlink data is transmission on the first serving cell using the licensed band, and
  - when the previous transmission of the downlink data is not transmission on the first serving cell, select the second serving cell using the unlicensed band for transmitting the downlink data.

10. The base station of claim 7, wherein the at least one processor is further configured to:
- determine whether a quality of service (QoS) class identifier (QCI) of the bearer has a specific value,
- when the QCI of the bearer has the specific value, select the first serving cell using the licensed band for transmitting the downlink data, and
- when the QCI of the bearer fails to have the specific value, select the first serving cell using the licensed band or a second serving cell using the unlicensed band for transmitting the downlink data.

11. The base station of claim 7, wherein the at least one processor is further configured to:
- determine whether the bearer satisfies one of a first condition corresponding to a guaranteed bit rate, a second condition indicating that a packet delay budget of the bearer is smaller than a predetermined first reference value, a third condition indicating that a packet error loss rate of the bearer is smaller than a predetermined second reference value, and a fourth condition indicating that an allocation and retention priority of the bearer is smaller than a predetermined third reference value,
- when at least one of the first, second, third and fourth conditions is satisfied, select the first serving cell using the licensed band for transmitting the downlink data, and
- when none of the first, second, third and fourth conditions is satisfied, select the first serving cell using the licensed band or a second serving cell using the unlicensed band for transmitting the downlink data.

12. The base station of claim 7, wherein the at least one processor is further configured to:
- determine whether an allocation and retention priority (ARP) of the bearer is smaller than a predetermined fourth reference value,
- when the ARP of the bearer is smaller than the fourth reference value, select a first serving cell using the licensed band for transmitting the downlink data, and
- when the ARP of the bearer is not smaller than the fourth reference value, select the first serving cell using the licensed band or a second serving cell using the unlicensed band for transmitting the downlink data.

\* \* \* \* \*